No. 610,944. Patented Sept. 20, 1898.
B. P. MERRY.
CALF WEANER.
(Application filed Dec. 27, 1897.)
(No Model.)

Witnesses:
Howard D. Orr.
J. F. Mothershead

Inventor:
Benjamin P. Merry,
By Edson Bros,
Attorneys.

UNITED STATES PATENT OFFICE.

BENJAMIN P. MERRY, OF STRYKER, OHIO.

CALF-WEANER.

SPECIFICATION forming part of Letters Patent No. 610,944, dated September 20, 1898.

Application filed December 27, 1897. Serial No. 663,699. (No model.)

*To all whom it may concern:*

Be it known that I, BENJAMIN P. MERRY, a citizen of the United States, residing at Stryker, in the county of Williams and State of Ohio, have invented certain new and useful Improvements in Calf-Weaners; and I do hereby declare the following to be a full, clear, and exact description of the invention, such as will enable others skilled in the art to which it appertains to make and use the same.

My invention relates to an improved device termed a "calf-weaner."

It has for its object to prevent the animal or calf from reaching the teats of the cow, in addition to being equally adapted for the attachment thereto of means for leading cattle, and is readily applicable for use, is simple and easily constructed, and can be produced at a minimum expense.

To these ends the invention consists of a device or contrivance adapted to be applied to the nose of the animal, the jaws thereof being engaged and movable toward each other by a clasp compressing said device and actuating said jaws, said clasp, as also said jaws, being provided with pricking-points or barbs, substantially as hereinafter more fully disclosed, and specifically pointed out in the claim.

Figure 1:
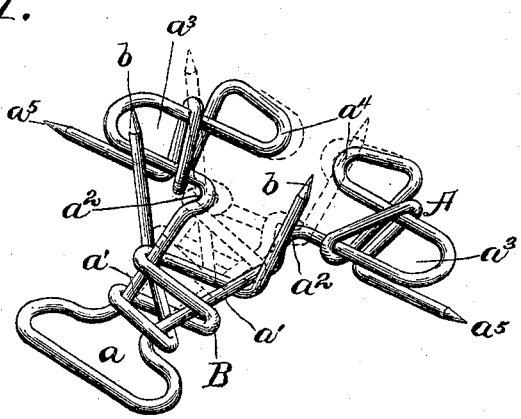
Figure 2:
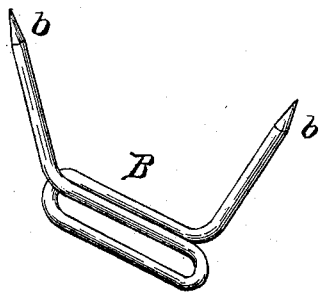

In the accompanying drawings, illustrating the preferred form of carrying out my invention, Figure 1 is a perspective view of my invention with the jaws in their unlocked position in full lines and in locked position in dotted lines. Fig. 2 is a modification of the clasp, showing it without a coiled-spring action.

Latitude will be allowed as to matters of detail, as these may be changed without departing from the spirit or principles of my invention and the same yet remain intact.

The device or appliance comprises two parts or members, the primary member or part A being formed, preferably, in a single piece. It may be of wire sufficiently stout to give it the requisite resistance or body. Said primary member or part A is bent into form, with a loop $a$, of suitable shape, at one end, adapted to permit of attachment thereto of a rope or line to lead the animal by when the device is in position upon the latter. Said part A has the wire portions $a'$, branching off from said loop $a$, provided with lateral recesses $a^2$, and thence extended, preferably, at their inner ends outward into lateral loops $a^3$, said wire portions then being carried and looped inward to form opposite jaws $a^4$ to permit the application thereof to the nostrils of the animal, the opposed rounded portions of the jaws $a^4$ bearing on the septum or cartilage, thus rendering the clamping operation painless or non-irritating. The wire portions $a'$, after being looped into the jaws $a^4$, are then preferably carried downward under the loops $a^2$ and upward upon the opposite sides of and over the same and again finally carried downward and preferably extended into lateral pricking-points or barbs $a^5$ to provide for preventing the animal reaching her own teats or the teats of other cattle, as has heretofore been the case.

The second part or member of this device comprises a slide or clasp B, adapted to embrace and slide upon the branching portions or arms $a'$ of the member A and to engage the recesses $a^2$ of said latter-referred-to part to lock the clasp or slide in place as against accidental displacement in securely holding the jaws $a^4$ in the nostrils of the animal. This slide or clasp B is preferably formed into a series of spring-coils, each compassing the arms or branches $a'$, thus forming it into substantially a coiled or helical spring to give it the requisite automatic spring action to properly compress or move said arms or branches together, consequently automatically springing and holding the jaws $a^4$ into engagement with the septum of the animal's nostrils. The terminals of the slide or clasp B extend forward into pricking-points or barbs $b$ to cause the same to prick or irritate the udder of the animal should the calf attempt to reach the teats, thus effectually weaning the calf.

As shown in Fig. 2, the slide or clasp B may be produced without the interposed coiled or helical spring between its pricking-points or barbs and itself and yet equally serve the purpose of my invention.

Having thus fully described my invention, what I claim, and desire to secure by Letters Patent, is—

In a device of the character described, the member or wire, with a laterally-extended forward end leading-loop, branched into rearwardly-diverging arms, each arm, in turn, extended outward, laterally, and rebent inward, and formed into jaws to engage the septum or cartilage of the animal's nostrils, the same then being looped or bent upon itself and terminating in pricking-points, combined with a sliding member or clasp embracing the arms of the aforesaid member and terminating in upstanding pricking-points, substantially as set forth.

In testimony whereof I affix my signature in presence of two witnesses.

BENJAMIN P. MERRY.

Witnesses:
ARTHUR JUSTICE,
S. A. JUSTICE.